United States Patent
Han et al.

(10) Patent No.: US 12,335,923 B2
(45) Date of Patent: Jun. 17, 2025

(54) METHOD AND DEVICE FOR GUARANTEE HIGH QOS SERVICE VIA MULTIPLE RESOURCE POOLS FOR NR V2X

(71) Applicant: LENOVO (BEIJING) LIMITED, Beijing (CN)

(72) Inventors: Jing Han, Beijing (CN); Lianhai Wu, Beijing (CN); Haiming Wang, Beijing (CN); Jie Hu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 481 days.

(21) Appl. No.: 17/760,584

(22) PCT Filed: Sep. 30, 2019

(86) PCT No.: PCT/CN2019/109317
§ 371 (c)(1),
(2) Date: Mar. 15, 2022

(87) PCT Pub. No.: WO2021/062585
PCT Pub. Date: Apr. 8, 2021

(65) Prior Publication Data
US 2022/0394676 A1 Dec. 8, 2022

(51) Int. Cl.
*H04W 72/04* (2023.01)
*H04W 72/02* (2009.01)
(Continued)

(52) U.S. Cl.
CPC ......... *H04W 72/02* (2013.01); *H04W 72/542* (2023.01); *H04W 72/56* (2023.01); *H04W 92/18* (2013.01)

(58) Field of Classification Search
CPC ... H04W 72/543; H04W 28/02; H04W 4/023; H04W 4/40; H04W 72/02; H04W 72/046;
(Continued)

(56) References Cited

U.S. PATENT DOCUMENTS

2021/0051673 A1* 2/2021 Chae .................... H04W 72/23

FOREIGN PATENT DOCUMENTS

| CN | 108605326 A | 9/2018 |
|----|-------------|--------|
| WO | 2017026409 A1 | 2/2017 |

OTHER PUBLICATIONS

International Searching Authority, "Written Opinion of the International Searching Authority," PCT/CN2019/109317, May 22, 2020, pp. 1-3.
(Continued)

*Primary Examiner* — Phuc H Tran
(74) *Attorney, Agent, or Firm* — Kunzler Bean & Adamson

(57) ABSTRACT

A method and a remote unit are disclosed. According to one embodiment, a method at a remote unit, comprises: receiving resource pool usage restriction(s) from a base unit, determining whether parameter(s) associated with a service to be transmitted fulfils the resource pool usage restriction(s), selecting a resource pool corresponding to the resource pool usage restriction if the parameter(s) associated with the service fulfills the resource pool usage restriction, and transmitting data for the service on the selected resource pool.

19 Claims, 6 Drawing Sheets

(51) Int. Cl.
*H04W 72/542* (2023.01)
*H04W 72/56* (2023.01)
*H04W 92/18* (2009.01)

(58) Field of Classification Search
CPC ... H04W 72/52; H04W 72/542; H04W 72/56; H04W 92/18; H04B 7/0404; H04B 7/0408; H04B 7/0695; H04B 7/088
See application file for complete search history.

(56) References Cited

OTHER PUBLICATIONS

ZTE, Sanechips, Summary of [105bis#31][NR/V2X] Resource pool configuration and selection [ZTE], 3GPP TSG-RAN WG2 #106, R2-1906495, May 13-17, 2019, pp. 1-18, Reno, USA.

* cited by examiner

METHOD AND DEVICE FOR GUARANTEE HIGH QOS SERVICE VIA MULTIPLE RESOURCE POOLS FOR NR V2X

FIELD

The subject matter disclosed herein generally relates to wireless communications and, more particularly, to a method for guarantee high quality of service (QoS) service via multiple resource pools for new radio (NR) vehicle-to-everything (V2X) and a device to perform the method.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Multiple User MIMO (MIMO), Frequency Range 1 (FR1), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Channel State Information Reference Signal (CSI-RS), Bandwidth Part (BWP), Hybrid Automatic Repeat Request Acknowledgement (HARQ-ACK), Positive Acknowledgement (ACK), Negative Acknowledgement (NACK), Physical Downlink Shared Channel (PDSCH), Code Block (CB), Code Block Group (CBG), Radio Resource Control (RRC), Identification (ID), Transmission Power Control (TPC), Radio Network Temporary Identifier (RNTI), Cell-RNTI (C-RNTI), Configured Scheduling RNTI (CS-RNTI), Transmission Mode (TM), Transmit and Receive Point (TRP), Channel State Information (CSI), Network (NW), Component Carrier (CC), Media Access Control (MAC), Control Element (CE), Sidelink Radio Bearer (SLRB), Vehicle-to-Everything (V2X), Sidelink (SL), Vehicle to Vehicle (V2V), Vehicle to Infrastructure (V2I), Vehicle to Pedestrian (V2P), Vehicle to Network (V2N), Quality of Service (QoS), QoS Class Identifier (QCI), Access Stratum (AS), Radio Access Network (RAN), Protocol Data Unit (PDU), QoS Flow ID (QFI), PC5 QoS Flow ID (PFI), Service Data Adaptation Protocol (SDAP), Packet Data Convergence Protocol (PDCP), Radio Link Control (RLC), Logical Channel (LCH), Next Generation eNodeB (ng-eNB), System Information Block (SIB), Packet Delay Budget (PDB), Packet Error Rate (PER), Transmission (Tx), Reception (Rx), Guaranteed Bit Rate (GBR), 5G QoS Identifier (5QI), PC5 5QI (PQI), ProSe per packet priority (PPPP), ProSe per packet priority Reliability (PPPR), Channel Busy Ratio (CBR), Information Element (IE), Transmission Block (TB), Pysical Sidelink Share Channel (PSSCH), Reference Signal Receiving Power (RSRP).

V2X is a form of technology that allows vehicles to communicate with moving parts of the traffic system around them. V2X has several components. One of them is V2V, or vehicle to vehicle, which allows vehicles to communicate one another. Another component is V2I, or vehicle to infrastructure, allows vehicles to communicate with external systems such as street lights, buildings Another component is V2P, or vehicle to pedestrian, allows vehicles to communicate with people such as cyclists or pedestrians. Another component is V2N, or vehicle to network, allows vehicles to communicate with cloud server to realize navigation, entertainment, software update etc. functions.

In 3GPP Release 15, the V2X functionalities are expanded to support 5G. The main advantage of V2X includes support of both direct communication between vehicles (V2V) and traditional cellular-network based communication. Also, V2X provides a migration path to 5G based systems and services.

To ensure that bearer traffic in LTE networks is appropriately handled, a mechanism is needed to classify the different types of bearers into different classes, with each class having appropriate QoS parameters for the traffic type. Examples of the QoS parameters include Guaranteed Bit Rate (GBR) or non-Guaranteed Bit Rate (non-GBR), Priority Handling, Packet Delay Budget (PDB) and Packet Error Rate (PER). This overall mechanism is called QoS Class Identifier (QCI).

In NR, networks are able to support a massive amount of diverse V2X service data flows with different characteristics and QoS requirements in rather flexible, scalable and efficient ways. The QoS requirements are provided in terms of, e.g., data rate, packet delay or latency, and reliability for different access or priority classes. The 5G QoS Indicator is used in 3GPP to identify a specific QoS forwarding behavior for a 5G QoS Flow (similar to the QCI value used for LTE).

The Uu interface is the radio interface between the mobile and the radio access network. The direct communication between vehicle and other devices uses so-called PC5 interface. PC5 refers to a reference point where the UE directly communicates with another UE over the direct channel.

For Uu-based communications, the 5G QoS Identifier (5QI) model was re-used for V2X; however new 5QIs are planned for some low latency and high reliability V2X services. For PC5-based communications, the changes were more drastic. Here, the ProSE per packet priority (PPPP) model was concluded as not efficient to deal with the V2X service requirements; hence for NR based unicast, groupcast and broadcast PC5 communication, Per-flow QoS model for PC5 QoS management shall be applied and a new type of 5QI (aka PQI: PC5 5QI) is introduced specifically for PC5 interface.

Transmission and reception opportunities for sidelink direct communications are associated with a set of periodically occurring time-domain periods known as resource pools. A UE can be configured with multiple resource pools for transmission and reception.

This invention is aimed at apparatus and methods to address the issue of guarantee high QoS service via multiple resource pools for NR V2X.

SUMMARY

Methods and apparatuses for guarantee high QoS service via multiple resource pools for NR V2X are disclosed.

In one embodiment, a method at a remote unit, comprises: receiving resource pool usage restriction(s) from a base unit, determining whether parameter(s) associated with a service to be transmitted fulfils the resource pool usage restriction(s), selecting a resource pool corresponding to the resource pool usage restriction if the parameter(s) associated with the service fulfills the resource pool usage restriction, and transmitting data for the service on the selected resource pool.

In another embodiment, a method at a base unit, comprises: configuring multiple resource pools for a remote unit, and configuring resource pool usage restriction(s) for the remote unit to select a resource pool among the multiple resource pools to transmit data of a service.

In still another embodiment, a remote unit, comprises a transceiver; a memory; and a processor coupled to the transceiver and the memory and configured to: control the transceiver to receive resource pool usage restriction(s) from a base unit, determine whether parameter(s) associated with a service to be transmitted fulfils the resource pool usage restriction(s), select a resource pool corresponding to the resource pool usage restriction if the parameter(s) associated with the service fulfills the resource pool usage restriction, and control the transceiver to transmit data for the service on the selected resource pool.

In still another embodiment, a base unit, comprises a transceiver; a memory; and a processor coupled to the transceiver and the memory and configured to: configure multiple resource pools for a remote unit, and configure resource pool usage restriction(s) for the remote unit to select a resource pool among the multiple resource pools to transmit data of a service.

The following features can be applied to the above embodiments commonly.

The resource pool usage restriction(s) includes a list of values or a threshold for the values. If the parameter(s) associated with the service is in the list of values or larger or lower than the threshold, the resource pool corresponding to the resource pool usage restriction is selected for the service.

The resource pool usage restriction(s) are configured differently for different channel busy ratio (CBR) range.

The resource pool usage restriction(s) includes criteria for the remote unit to combine multiple resource pools as one virtual resource pool for resource selection.

The resource pool usage restriction(s) includes a list of specific services. If the remote unit is receiving data of a service belonging to the list of specific services, the remote unit avoids transmitting data during the reception period.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting of scope, the embodiments will be described and explained with additional specificity and detail through the use of the accompanying drawings, in which.

DETAILED DESCRIPTION

Figure 1:
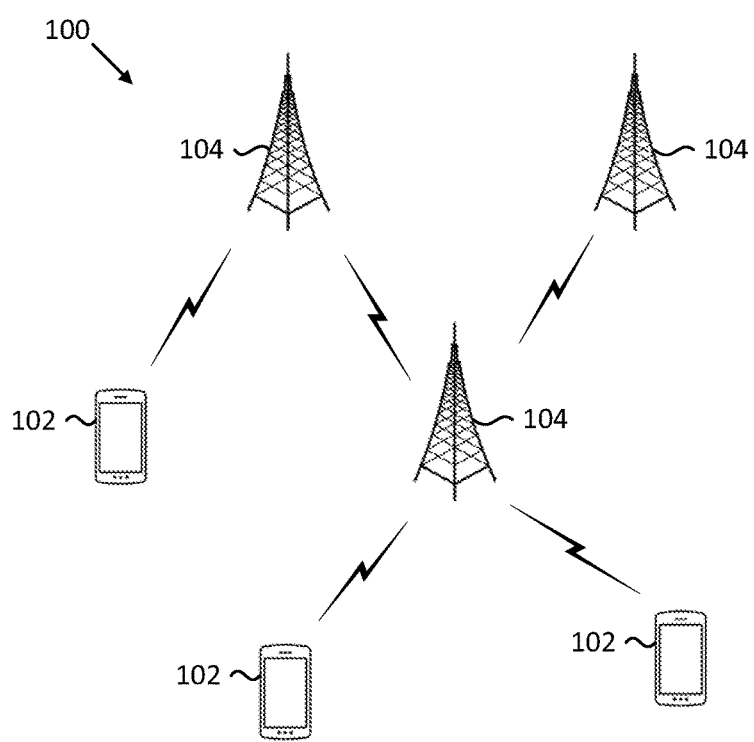
FIG. 1 is a schematic block diagram illustrating one embodiment of a wireless communication system for guarantee high QoS service via multiple resource pools for NR V2X.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer-readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100 for guarantee high QoS service via multiple resource pools for NR V2X. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
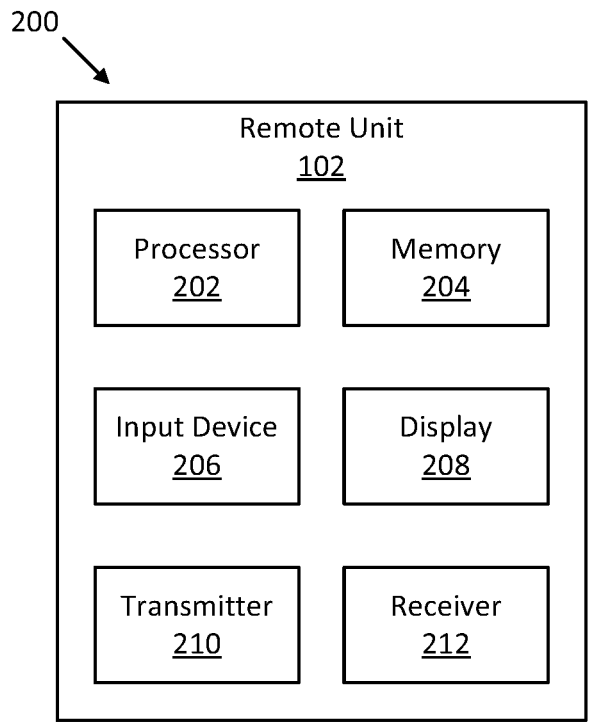
FIG. 2 is a schematic block diagram illustrating one embodiment of an apparatus that may be used for guarantee high QoS service via multiple resource pools for NR V2X.

FIG. 2 depicts one embodiment of an apparatus 200 that may be used for guarantee high QoS service via multiple resource pools for NR V2X. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
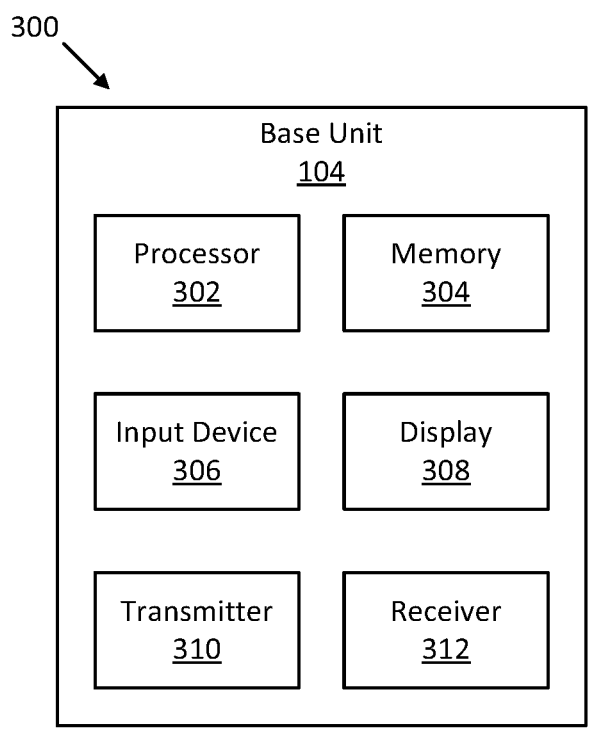
FIG. 3 is a schematic block diagram illustrating one embodiment of an apparatus that may be used for guarantee high QoS service via multiple resource pools for NR V2X.

FIG. 3 depicts one embodiment of an apparatus 300 that may be used for guarantee high QoS service via multiple resource pools for NR V2X. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In NR, advanced V2X services are introduced. The advanced V2X services are those services which are developed beyond the scope of LTE Release 15 V2X and would require enhanced NR system and new NR sidelink to meet the stringent requirements. The requirements for NR V2X system include a flexible design to support services with low latency and high reliability requirements along with support for higher capacity and better coverage.

For NR V2X, the QoS requirements are more stringent than V2X service in LTE. For example, as shown in Table 1, which is a table of mapping between PQI to QoS characteristics for NR V2X, the latency requirement is up to 3 ms, and the reliability requirement, i.e., packet error rate (PER), is up to $10^{-5}$.

TABLE 1

Mapping between PQI to QoS characteristic (TS 23.287)

| PQI Value | Default Priority Level | Packet Delay Budget | Packet Error Rate | Default Maximum Data Burst Volume | Default Averaging Window |
|---|---|---|---|---|---|
| 83 | 2 | 3 ms | $10^{-5}$ | 2000 byte | 2000 ms |
| 55 | 3 | 10 ms | $10^{-4}$ | N/A | N/A |
| 82 | 3 | 10 ms | $10^{-4}$ | 2000 bytes | 2000 ms |
| 1 | 3 | 20 ms | $10^{-4}$ | N/A | 2000 ms |
| 3 | 3 | 100 ms | $10^{-4}$ | N/A | 2000 ms |
| 2 | 4 | 50 ms | $10^{-2}$ | N/A | 2000 ms |
| 58 | 4 | 100 ms | $10^{-2}$ | N/A | N/A |
| 57 | 5 | 25 ms | $10^{-1}$ | N/A | N/A |
| 56 | 6 | 20 ms | $10^{-1}$ | N/A | N/A |

TABLE 1-continued

Mapping between PQI to QoS characteristic (TS 23.287)

| PQI Value | Default Priority Level | Packet Delay Budget | Packet Error Rate | Default Maximum Data Burst Volume | Default Averaging Window |
|---|---|---|---|---|---|
| 59 | 6 | 500 ms | $10^{-1}$ | N/A | N/A |

The QoS requirements for advanced V2X service in NR V2X, as shown in the above table, are much higher than QoS requirements of LTE V2X services, in which the latency requirement is 20 ms and the reliability requirement is expected to be $10^{-2}$.

On the other hand, the QoS structure in NR V2X is per-flow QoS which is aligned with the case in Uu interface. This is different from the QoS structure in LTE V2X which is per-packet QoS and reflects the QoS requirements with ProSe per packet priority (PPPP)/ProSe per packet priority Reliability (PPPR). Per-flow QoS structure may impact the resource pool selection procedure.

Several solutions for resource pool selection in NR V2X will be described below.

Figure 4:
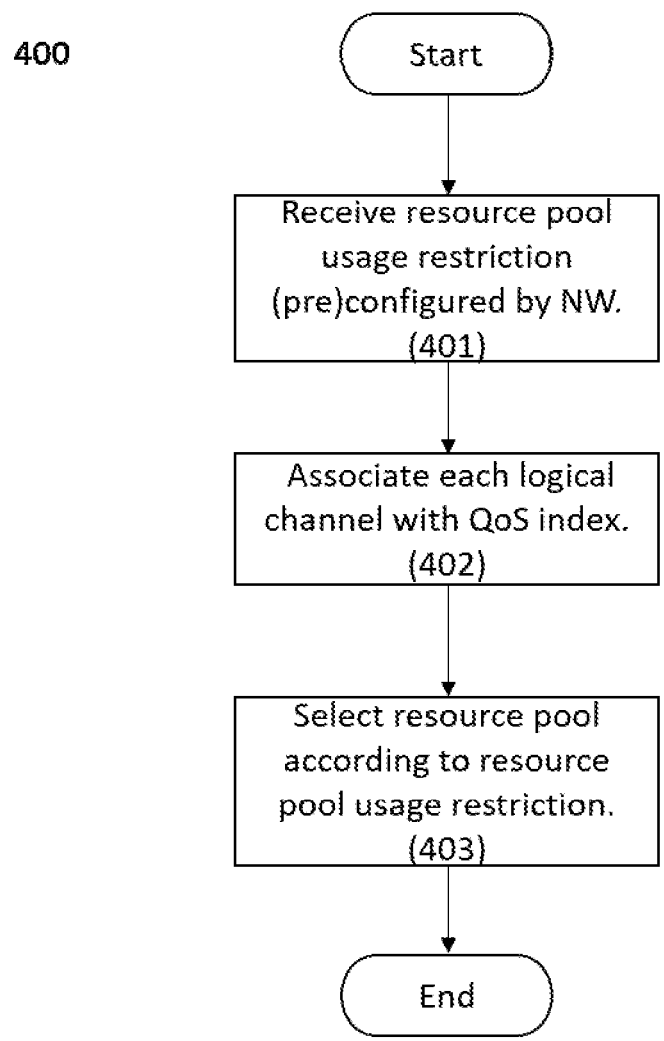
FIG. 4 is a flow chart illustrating a method for selecting a resource pool according to an embodiment of the invention.

FIG. 4 is a flow chart illustrating a method for selecting a resource pool according to an embodiment of the invention.

In order to achieve the high QoS requirements in NR V2X, a "high" QoS resource pool dedicated for the V2X service with high QoS requirements is enabled. There are several solutions for selecting the "high" QoS resource pool.

Solution 1: Resource Pool Selection Based on QoS Index

In Solution 1, NW may configure a resource pool usage restriction based on QoS index, e.g. PC5-5QI (PQI), QoS flow ID (QFI), or any index that can represent a set of QoS requirements. For example, the high resource pool may be used only for PQI 83/55/82 as shown in Table 1. And UE may perform resource pool selection based on QoS index, e.g. PQI, QFI, or any index that can represent a set of QoS requirements.

According to one embodiment, if NW or UE determines that UE autonomous resource allocation mode is used, NW will configure multiple resource pools for V2X UE by dedicated radio resource control (RRC) signaling or system information block (SIB) signaling, or pre-configuration. NW configures a resource pool usage restriction based on an index of QoS requirements for a V2X service or a PC5 QoS flow, e.g. PQI, QFI, or any index that can represent the QoS requirements. For example, the resource pool usage restriction may be a list of PQI values. The traffic or data from PC5 QoS flow associated with the PQI values in the list can be transmitted in the corresponding resource pool. As an example of resource pool usage restriction, a new IE pool-restriction may be introduced in resource pool configuration SL-CommResourcePoolV2X.

poolrestriction: SEQUENCE (SIZE (1 . . . 10)) OF SL-PQI-value, and SL-PQI-value: ENUMERATED {PQI1, PQI2, PQI3, PQI55, PQI56, PQI57, PQI58, PQI59, PQI82, PQI83, . . . } Here, SL-PQI-value is a set of all possible PQIs and poolrestriction is a subset of SL-PQI-value.

If UE is configured with mode 2 and configured with multiple resource pools with resource pool restriction, UE will perform resource pool selection procedure. UE may label each logical channel, with QoS index e.g. PQI associated, to establish the mapping relationship between logical channel and QoS index e.g. PQI. For example, logical channel 1 is associated with PQI1 and PQI2, logical channel 2 is associated with PQI83, logical channel 3 is associated with PQI55 and PQI82.

UE may determine whether the PQI(s) associated with the logical channel in media access control (MAC) protocol data unit (PDU) to be transmitted is included in the configured poolrestriction. UE may select a resource pool according to the determination result.

For example, as long as at least one of PQI(s) associated with the logical channel in MAC PDU to be transmitted is included in the poolrestriction, the UE may select the resource pool corresponding to the poolrestriction.

Alternatively, only if all PQI(s) associated with the logical channel in MAC PDU to be transmitted is included in the configured poolrestriction, UE may select the resource pool corresponding to the poolrestriction.

FIG. 4 illustrates procedure 400 in which a UE selects a resource pool according to resource pool usage restriction.

As shown in FIG. 4, at step 401, UE receives a resource pool usage restriction (pre)configured by NW. As described above, the resource pool usage restriction may be an IE poolrestriction which includes a list of PQIs.

At step 402, UE associates each logical channel with QoS index e.g. PQI.

At step 403, UE selects a resource pool according to the configured resource pool usage restriction. For example, UE may determine whether the PQI(s) that associated with the logical channel in MAC PDU to be transmitted is included in the configured poolrestriction. If at least one of PQI(s) or all of the PQI(s) associated with the logical channel in MAC PDU to be transmitted are included in the poolrestriction, UE may select the resource pool corresponding to the poolrestriction.

Solution 2: Resource Pool Selection Based on Logical Channel Information

In Solution 2, in resource pool configuration, NW may configure resource pool usage restriction based on logical channel information e.g. logical channel ID or logical channel priority. For example, the resource pool may be used only for a logical channel whose ID is associated with PQI 83/55/82. Logical channel priority may be (pre)configured by NW. Mapping between PQI/PC5 QoS Flow ID (PFI), logical channel (LCH) and sidelink radio bearer (SLRB) may also be (pre)configured by NW. And UE may perform resource pool selection based on logical channel information, e.g. logical channel ID or logical channel priority.

According to one embodiment, if NW or UE determines that UE autonomous resource allocation mode is used, NW may configure multiple resource pools for V2X UE, either by dedicated RRC signaling or SIB signaling, or pre-configuration. In the configuration of resource pool, NW may configure a resource pool usage restriction based on logical channel information, e.g. logical channel ID or logical channel priority. For example, the configuration of the resource pool usage restriction may be a list of logical channel IDs. The traffic or data on a logical channel whose ID is in the list may be transmitted in the corresponding resource pool. As an example of resource pool usage restriction, a new IE poolrestriction may be introduced in resource pool configuration SL-CommResourcePoolV2X.

poolrestriction: SEQUENCE (SIZE (1 . . . 16)) OF SL-LC-ID, and SL-LC-ID: ENUMERATED {LCID1, LCID2, LCID3, LCID4, LCID5, LCID6, LCID7, LCID8, LCID9, LCID10, LCID11, LCID12, LCID13, LCID14, LCID15, LCID16}. Here, SL-LC-ID is a set of all possible logical channel IDs and poolrestriction is a subset of SL-LC-ID.

As another example, the resource pool usage restriction may be a list of logical channel priorities. The traffic or data on a logical channel with logical channel priority in the list may be transmitted in the corresponding resource pool. As an example of resource pool usage restriction, a new IE poolrestriction is introduced in resource pool configuration SL-CommResourcePoolV2X.

poolrestriction: SEQUENCE (SIZE (1 . . . 16)) OF SL-LC-Priority, and SL-LC-Priority: ENUMERATED {LCPri1, LCPri2, LCPri3, LCPri4, LCPri5, LCPri6, LCPri7, LCPri8, LCPri9, LCPri10, LCPri11, LCPri12, LCPri13, LCPri14, LCPri15, LCPri16}. Here, SL-LC-Priority is a set of all possible logical channel priorities and poolrestriction is a subset of SL-LC-Priority.

As a third example, the configuration of the resource pool usage restriction may be a threshold that defines the minimum priority of the logical channel that can be used in the resource pool. For example, poolrestriction: ENUMERATED {LCPri1, LCPri2, LCPri3, LCPri4, LCPri5, LCPri6, LCPri7, LCPri8, LCPri9, LCPri10, LCPri11, LCPri12, LCPri13, LCPri14, LCPri15, LCPri16}.

When the UE performs resource pool selection, UE may select a resource pool according to logical channel ID or logical channel priority with at least one of the following rules.

As long as at least one logical channel ID or logical channel priority associated with the logical channel in MAC PDU to be transmitted is included in the configured poolrestriction includes, UE may select the corresponding resource pool.

Alternatively, only if all logical channel ID(s) or logical channel priority(ies) associated with the logical channel in MAC PDU to be transmitted are included in the configured poolrestriction includes, UE may select the corresponding resource pool.

Alternatively, if the highest logical channel priority associated with the logical channel in MAC PDU to be transmitted is larger or equal than the threshold configured in poolrestriction, UE may select the corresponding resource pool.

The resource pool selection procedure for Solution 2 is similar to that for Solution 1. Since the selection is made based on logical channel ID or logical channel priority, step 402 for associating logical channel with QoS index is not necessary.

Solution 3: Resource Pool Selection Based on QoS Parameters

In Solution 3, in resource pool configuration, NW may configure resource pool usage restriction based on multiple QoS parameter, e.g. Priority level and Packet Delay Budget (PDB). The configuration may be a list of multiple QoS parameters, or thresholds of the multiple QoS parameters. And UE may perform resource pool selection based on QoS parameters, e.g. Priority level and PDB jointly.

According to one embodiment, if NW or UE determines that UE autonomous resource allocation mode is used, NW may configure multiple resource pool for V2X UE, either by dedicated RRC signaling or SIB signaling, or pre-configuration. In the configuration of resource pool, NW may configure a resource pool usage restriction, based on multiple QoS parameters simultaneously, e.g. Priority level (traffic priority information) and PDB (traffic latency requirement). For example, the configuration of the resource pool usage restriction may be a list of Priority levels and PDBs. The traffic or data associated with the configured Priority level and PDB may be transmitted in the corresponding resource pool. As an example of resource pool usage restriction, two new IEs poolrestriction-priority and poolrestriction-PDB may be introduced in resource pool configuration SL-CommResourcePoolV2X.

poolrestriction-priority: SEQUENCE (SIZE (1 ... 5)) OF SL-Priority, and SL-Priority: ENUMERATED {2, 3, 4, 5, 6, ... }. Here, SL-Priority is a set of all possible Priority levels and poolrestriction-priority is a subset of SL-Priority.

poolrestriction-PDB: SEQUENCE (SIZE (1 ... 7)) OF SL-PDB, and SL-PDB: ENUMERATED {3 ms, 10 ms, 20 ms, 25 ms, 50 ms, 100 ms, 500 ms, ... }. Here, SL-PDB is a set of all possible PDBs and poolrestriction-PDB is a subset of SL-PDB.

As another example, the configuration of the resource pool usage restriction may be a threshold that defines the minimum priority/maximum PDB that can be used in the resource pool. For example, poolrestriction-priority: ENUMERATED {2, 3, 4, 5, 6, ... }, and poolrestriction-PDB: ENUMERATED {3 ms, 10 ms, 20 ms, 25 ms, 50 ms, 100 ms, 500 ms, ... }.

At UE side, firstly UE may label each logical channel with multiple QoS parameters, e.g. Priority level and PDB that the V2X traffic is associated with. For example, logical channel 1 is associated with priority2 and PDB 3 ms, logical channel 2 is associated with priority3 and PDB 10 ms and 20 ms, logical channel 3 is associated with priority 5/6 and PDB 100 ms and 500 ms.

When the UE performs resource pool selection, UE may select a resource pool based on the list of multiple QoS parameters, or the thresholds of multiple QoS parameters. UE may select a resource pool according to at least one of the following rules.

As long as at least one Priority level and at least one PDB associated with the logical channel in MAC PDU to be transmitted are included in the configured poolrestriction-priority and poolrestriction-PDB, UE may select the corresponding resource pool.

Alternatively, only if all Priority levels and all PDBs associated with the logical channel in MAC PDU to be transmitted are included in the configured poolrestriction-priority and poolrestriction-PDB, UE may select the corresponding resource pool.

Alternatively, if the highest Priority level associated with logical channel in MAC PDU to be transmitted is larger or equal than the threshold configured in poolrestriction-priority, and if the lowest PDB associated logical channel in MAC PDU to be transmitted is lower or equal than the threshold configured in poolrestriction-PDB, UE may select the corresponding resource pool.

The resource pool selection procedure for Solution 3 is similar to that for Solution 1. Instead of associating logical channel with QoS index, UE may associate each logical channel with multiple QoS parameters at step 402.

Figure 5:
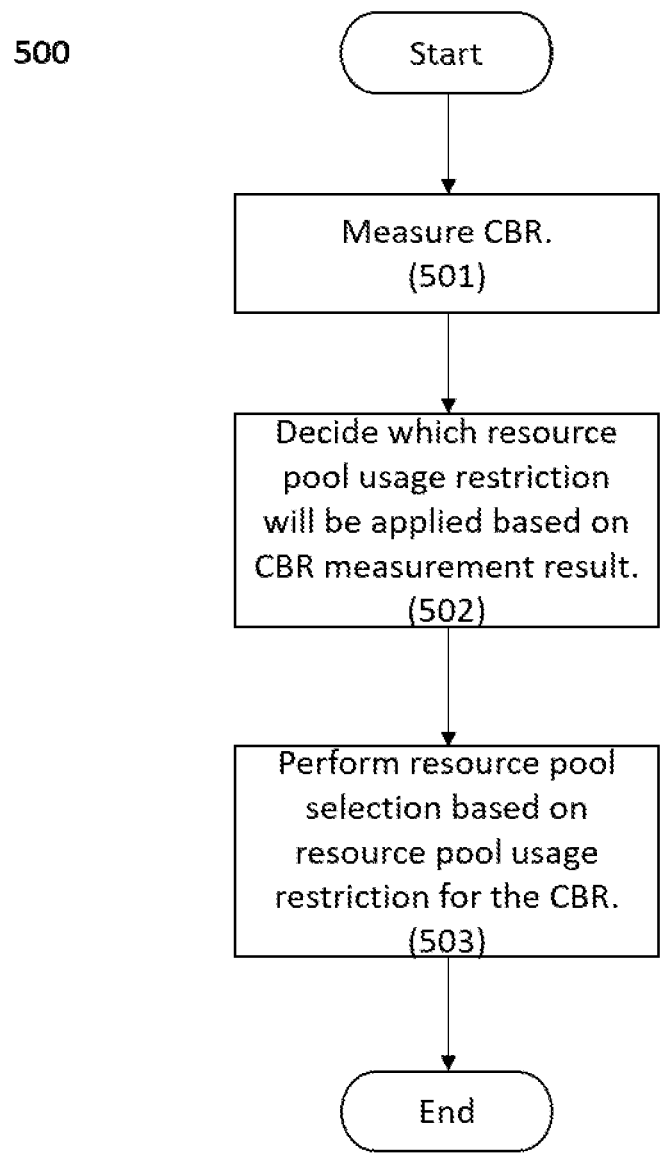
FIG. 5 is a flow chart illustrating a method of selecting a resource pool for different CBR according to an embodiment of the invention.

FIG. 5 is a flow chart illustrating a method of selecting a resource pool for different CBR according to an embodiment of the invention.

According to an embodiment, NW may (pre)configure multiple sets of resource pool usage restriction configurations, e.g. multiple poolrestrictions, to associate with different CBR ranges. That is, in different CBR range, poolrestriction may be different. For example, for resource pool #1, poolrestriction #1 is configured for CBR range #1, poolrestriction #2 is configured for CBR range #2, and poolrestriction #3 is configured for CBR range #3. The CBR range may be configured with lower and upper CBR values, or configured with a CBR threshold.

At UE side, if resource pool usage restriction is configured with associated CBR range, firstly UE may measure the CBR. Then UE may decide which resource pool usage restriction will be applied based on the CBR measurement result. For example, for resource pool #1, if measured CBR results fall in CBR range #2 (pre)configured by the NW, UE will perform the resource pool selection based on poolrestriction #2. The selection procedure is similar to those described above with reference FIG. 4.

FIG. 5 illustrates a procedure 500 in which a UE selects resource pool according to CBR.

As shown in FIG. 5, at step 501, UE measures the CBR of the channel.

At step 502, UE decides which resource pool usage restriction will be applied based on the CBR measurement result.

At step 503, UE performs resource pool selection based on the resource pool usage restriction for the corresponding CBR.

Figure 6:
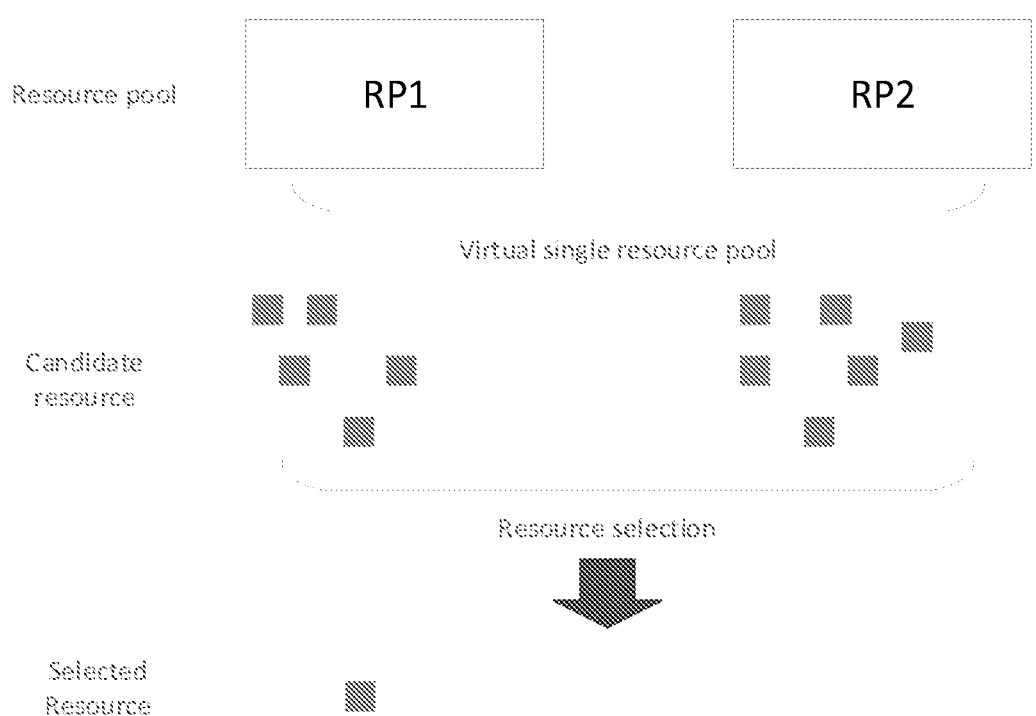
FIG. 6 is a schematic illustrating multiple resource pools combination according to an embodiment of the invention.

FIG. 6 is a schematic illustrating multiple resource pools combination according to an embodiment of the invention.

UE may not always perform resource pool selection. Under some condition, UE may combine multiple resource pools as one "virtual" resource pool and perform resource selection in the virtual resource pool. The condition may be (pre)configured by NW.

According to an embodiment, NW may (pre)configure criteria about when UE should regard multiple resource pools as a "virtual" single resource pool for resource selection. In the case of "virtual" single resource pool, candidate resource can be increased and resource collision probability can be decreased. One example of the criteria is based on CBR of each resource pool. Exemplary criteria may be when the CBR value of "high" QoS resource pool is larger than a threshold which is configured by higher layer, and/or, when the CBR value of "normal" QoS resource pool is lower than a threshold which is configured by higher layer.

Further, the criteria may be per-service configured. For example, for specific service (which can be represented by PQI, QFI, logical channel ID, or any index to represent the service), the above two exemplary conditions are configured as the criteria.

At UE side, before resource pool selection is performed, UE may determine whether to combine multiple resource pools to one "virtual" resource pool based on the NW (pre)configured criteria. For example, for specific service, if the above two exemplary conditions are fulfilled for multiple resource pools, UE will not perform resource pool selection. Instead, UE may perform resource selection in the "virtual" resource pool combined from the multiple resource pools. More specifically, UE will initialize a SetA within the "virtual" resource pool (i.e. all resources in multiple resource pools), and put the selected candidate resource into a SetB. And then UE selects the best resource (e.g. with best PSSCH-RSRP) in SetB for transmission.

As shown in FIG. 6, there are two resources pools, RP1 and RP2. If the configured criteria are fulfilled, RP1 and RP2 are combined into a virtual single resource pool. UE may select candidate resources from the virtual single resource pool. Finally, a resource is selected from these candidate resources for data transmission.

With respect to the resource pool selection procured, whether the resource pool selection is performed per-packet or per-flow will be described below.

For per-packet pool selection, resource pool selection is performed during SL grant selection that defined in 3GPP TS 36.321. While for per-flow pool selection, resource pool selection is performed when new PC5 QoS flow arrives, and is performed by RRC layer or Service Data Adaptation Protocol (SDAP) layer.

According to an embodiment, UE may determine whether to perform "virtual" resource pool combination or resource pool selection for each packet (each MAC PDU, each transmission block (TB)). That is, the "virtual" resource pool combination or resource pool selection procedure is triggered for each SL grant creation defined in MAC layer.

According to another embodiment, "virtual" resource pool combination or resource pool selection is performed when a new PC5 QoS flow arrives, or after a new PC5 QoS flow is mapped to a SLRB. For example, when new PC5 QoS flow arrives, UE will map new PC5 QoS flow to exist/new SLRB according to the configuration from NW (e.g., via SIB) or pre-configuration. And then SDAP layer or RRC layer may perform the "virtual" resource pool combination or resource pool selection. After that, SDAP layer or RRC layer may indicate MAC layer that whether multiple resource pool is combined to one "virtual" resource pool, or indicate the selected resource pool for the corresponding SLRB/logical channel. Next, MAC layer may transmit MAC PDU on a logical channel with resource from the "virtual" resource pool or selected resource pool.

Figure 7:
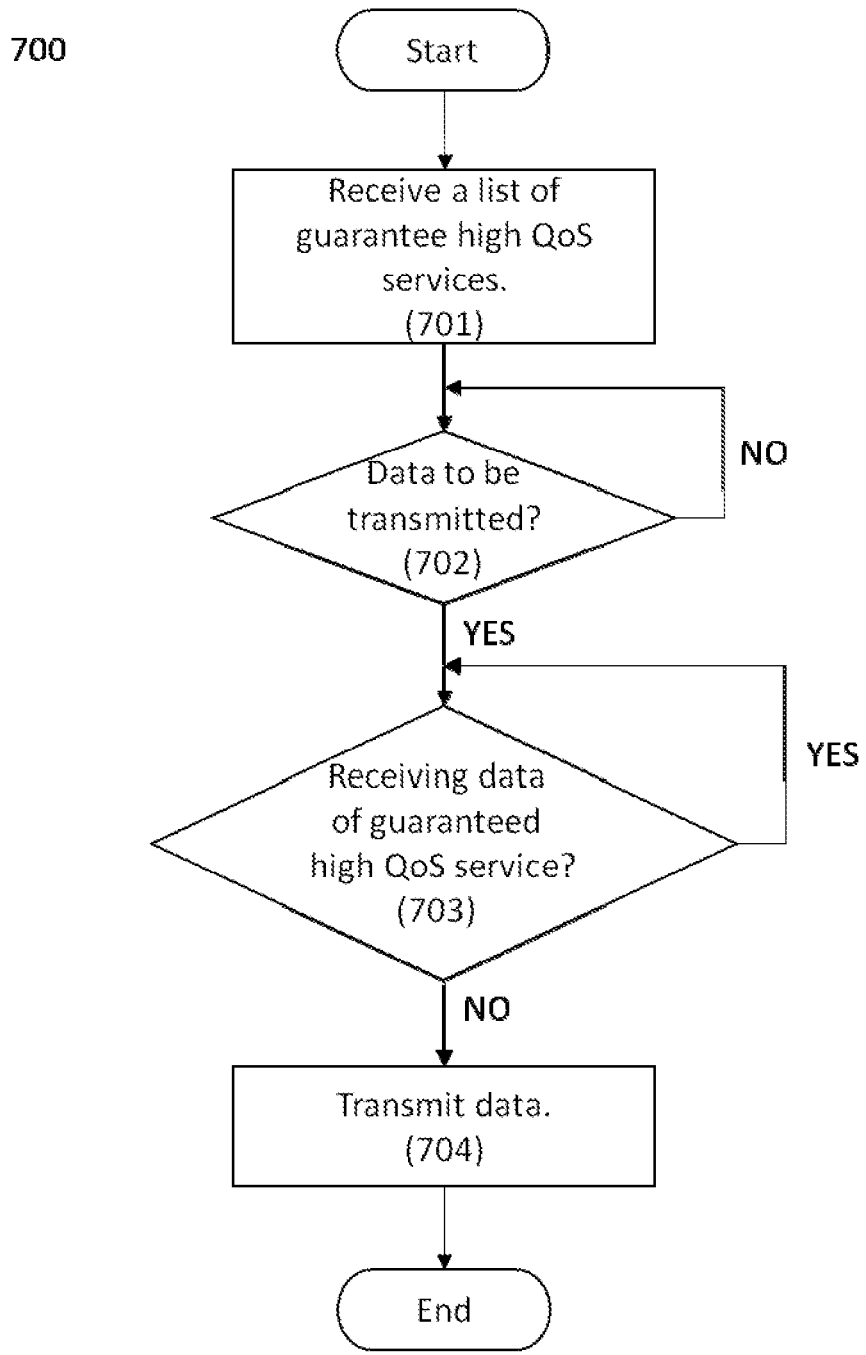
FIG. 7 is a flow chart illustrating a method for a UE to transmit data when receiving a high QoS traffic according to an embodiment of the invention.

FIG. 7 is a flow chart illustrating a method for a UE to transmit data when receiving a high QoS traffic according to an embodiment of the invention.

In NR V2X, half-duplex effect at Rx UE side may degrade the reliability of advanced V2X traffic. In order to mitigate half-duplex effect for Rx UE, the following solution is proposed.

If Rx UE cannot receive all transmission opportunities of the MAC PDU for high QoS requirement service, the service quality will be degraded. For example, when PER require $10^{-5}$ reliability, but Rx UE only receives 4 transmissions since the Rx UE is transmitting its own data during the receiving opportunity, then only $10^{-4}$ reliability can be guaranteed for such high QoS requirement service. Thus, for data of high QoS requirement service, Rx UE is preferred not to transmit data at the time when receiving data from high QoS requirement service. Therefore, Rx UE should know whether it is receiving the data from a high QoS requirement service.

According to an embodiment, NW may (pre)configure a list of "guaranteed high QoS services", so that when Rx UE is receiving data from a service in the list, Rx UE will avoid transmitting data so that the high QoS traffic reception will not be missed. This may be realized by the following options.

Option 1: For each resource pool, NW may (pre)configure a list of "guaranteed high QoS services", or a threshold for "guaranteed high QoS services".

Option 2: NW may (pre)configure 1 bit indication to indicate whether data transmission on "high" QoS resource pool will be prioritized.

At US side, if this feature is enabled, UE will prioritize high QoS requirement service reception, other than data transmission.

UE may determine whether there is high QoS service reception before each SL grant selection in MAC layer. If there is high QoS service reception in the current time slot, UE will not perform SL grant selection and will not transmit MAC PDU. The MAC PDU to be transmitted may be delayed to the next time slot.

FIG. 7 illustrates a procedure 700 in which a UE transmits data when receiving a high QoS service.

As shown in FIG. 7, at step 701, UE receives a list of guarantee high QoS services configured by NW.

At step 702, the UE determines whether there is data to be transmitted.

If there is data to be transmitted (YES at step 702), the UE determines whether it is receiving data of service belonging to the configured list of guaranteed high QoS services (step 703).

If the UE is receiving data of a guaranteed high QoS service (YES at step 703), UE will not transmit data.

If the UE is not receiving data of a guaranteed high QoS service (NO at step 703), UE will transmit data (step 704).

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

With the embodiments described above, several solutions for the resource pool management to guarantee high QoS service are proposed. The solutions provide mechanisms that UE selects resource pool from multiple resource pools based on PQI, QFI, logical channel ID, logical channel priority, or combined Priority level and PDB in PQI table. The solutions provide a method for UE to combine multiple resource pools as one virtual resource pool under (pre) configured criteria. The solutions provide per-flow trigger for resource pool management. The solutions can mitigate half-duplex effect for Rx UE to achieve guarantee high QoS service requirement.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE) remote unit, the method comprising:
   receiving resource pool usage restriction(s) from a base station unit,
   receiving criteria for the UE to combine multiple resource pools as one virtual resource pool for resource selection,
   determining whether parameter(s) associated with a service to be transmitted fulfills the resource pool usage restriction(s), selecting a single resource pool corresponding to the resource pool usage restriction if the parameter(s) associated with the service fulfills the resource pool usage restriction, and transmitting data for the service on the single selected resource pool.

2. The method of claim 1, wherein, the resource pool usage restriction(s) includes a list of values or a threshold for the values, and the method further comprises:
  in response to the parameter(s) associated with the service being in the list of values or being larger or being lower than the threshold, the single resource pool corresponding to the resource pool usage restriction is selected for the service.

3. The method of claim 2, wherein, the values include indexes for quality of service (QOS) profile including at least any of PC5-5 QoS identification (PQI), QOS flow identification (QFI).

4. The method of claim 2, wherein, the values include logical channel information including at least any of logical channel identification, logical channel priority.

5. The method of claim 2, wherein, the values include multiple QOS parameters including at least any of priority level and packet delay budget (PDB).

6. The method of claim 1, wherein, the resource pool usage restriction(s) are configured differently for different channel busy ratio (CBR) range, the method further comprises:
  measuring CBR, and
  selecting the single resource pool based on the resource pool usage restriction corresponding to the measured CBR result.

7. The method of claim 1, wherein, the resource pool usage restriction(s) includes criteria for the UE to combine multiple resource pools as one virtual resource pool for resource selection, and the method further comprises:
  determining whether the parameter(s) associated with the service fulfills the criteria, and
  performing resource selection in the virtual resource pool if the parameter(s) associated with the service fulfills the criteria.

8. The method of claim 7, wherein, the criteria are configured based on CBR, and the method further comprises:
  measuring the CBR, and
  determining whether to combine multiple resource pools as one virtual resource pool for resource selection based on the measured CBR result.

9. The method of claim 1, wherein, the resource pool usage restriction(s) includes a list of specific services, and the method further comprises:
  in response to the UE receiving data of a service belonging to the list of specific services, the UE avoids transmitting data during a reception period.

10. The method of claim 1, wherein, the determining step is performed when a new PC5 QoS flow arrives, when a PC5 QoS flow is mapped to a sidelink radio bearer (SLRB), or when the UE is creating a sidelink (SL) grant.

11. A base station unit, the base station unit further comprising:

a memory; and at least one processor coupled with the memory and configured to cause the base station to:
  configure multiple resource pools for a user equipment (UE),
  configure resource pool usage restriction(s) for the UE to select a single resource pool among the multiple resource pools to transmit data of a service, and
  configure criteria for the UE to combine multiple resource pools as one virtual resource pool for resource selection.

12. The base station of claim 11, wherein, the resource pool usage restriction(s) are configured based on indexes for quality of service (QOS) profile including at least any of PC5-5 QoS identification (PQI), QoS flow identification (QFI).

13. The base station of claim 11, wherein, the resource pool usage restriction(s) are configured based on logical channel information including at least any of logical channel identification, logical channel priority.

14. The base station of claim 11, wherein, the resource pool usage restriction(s) are configured based on multiple QoS parameters including at least any of priority level and packet delay budget (PDB).

15. The base station of claim 11, wherein, the resource pool usage restriction(s) are configured differently for different channel busy ratio (CBR) range.

16. The base station of claim 11, wherein, the criteria are configured based on CBR.

17. The base station of claim 11, wherein, the resource pool usage restriction(s) includes a list of specific services to indicate the UE to avoid transmitting data during receiving data of a service belonging to the list of specific services.

18. A user equipment (UE) comprising:

a memory; and at least one processor coupled to the memory and configured to:
  receive resource pool usage restriction(s) from a base station unit;
  receive criteria for the UE to combine multiple resource pools as one virtual resource pool for resource selection;
  determine whether parameter(s) associated with a service to be transmitted fulfills the resource pool usage restriction(s);
  select a single resource pool corresponding to the resource pool usage restriction if the parameter(s) associated with the service fulfills the resource pool usage restriction; and
  transmit data for the service on the selected single resource pool.

19. The UE of claim 18, wherein, the resource pool usage restriction(s) includes a list of values or a threshold for the values, and the at least one processor is further configured to:
  if the parameter(s) associated with the service is in the list of values or larger or lower than the threshold, select the single resource pool corresponding to the single resource pool usage restriction for the service.

* * * * *